TELEVISION MONITORING SYSTEM FOR PENETRATING A LIGHT BACKSCATTERING MEDIUM

Filed Nov. 7, 1966 2 Sheets-Sheet 1

INVENTOR.
PAUL J. HECKMAN, JR.
BY
MICHAEL F. OGLO
ROY MILLER
ATTORNEYS.

INVENTOR.
PAUL J. HECKMAN, JR.
BY
MICHAEL F. OGLO
ROY MILLER
ATTORNEYS.

United States Patent Office 3,467,773

Patented Sept. 16, 1969

3,467,773

TELEVISION MONITORING SYSTEM FOR PENETRATING A LIGHT BACKSCATTERING MEDIUM

Paul J. Heckman, Jr., Pasadena, Calif., assignor to the United States of America as represented by the Secretary of the Navy Filed Nov. 7, 1966, Ser. No. 592,664
Int. Cl. H04n 7/02, 5/38
U.S. Cl. 178—7.2 4 Claims

ABSTRACT OF THE DISCLOSURE

The invention is a television monitoring system for penetrating a medium which tends to backscatter light, and therefore has special utility in connection with underwater search operations. The system includes a periodically pulsed light source which emits extremely short bursts of illumination having a duration of the order of 20 nanoseconds. An image orthicon-type camera tube is employed as the television pickup. The photocathode of the image orthicon tube is energized by a periodic pulse signal which is also of a 20 nanosecond order of duration. The photocathode energizing pulse is in adjustably delayed phase relationship to the illumination pulse with a resolution of adjustment of the delay of the order of nanoseconds. The camera tube only receives light from a desired range of distances from the line of sight of the camera corresponding to the range of two-way distances light may travel during the 20 nanosecond period the photocathode is energized. The blurring effect of backscattered light from other ranges is avoided.

The invention described herein may be manufactured and used by or for the Government of the United States of America for governmental purposes without the payment of any royalities thereon or therefor.

This invention relates to improvements in a television monitoring system which increases the capability to penetrate a medium which backscatters light. A special utility of the present invention is in connection with a closed circuit television monitoring system for use with underwater vehicles in the search for an object on the ocean floor, as in connection with the submarine rescue operations or the recovery of sunken ordnance.

Water is an inherently turbid medium which backscatters light. The inability to penetrate this medium for appreciable ranges with an illumination and optical viewing system has been a critical limitation upon the speed of underwater search operations. Prior art optical viewing systems have, in general, been limited to ranges of the order of 15 feet in deep ocean search operations. Occasional successful operations at ranges in excess of this have been achieved, but could not be reliably repeated. With their fields of view thusly limited by viewing ranges of this order of magnitude, the search vehicles could cover only very limited strips of ocean bottom with each "pass." Also the limited range required operation of the vehicle at only slight heights above the ocean floor, where speed and maneuverability of the vehicle is severely limited.

Accordingly, an object of the present invention is to provide an improved illumination and television monitoring system which has increased capability for penetrating a backscattering medium.

Another object is to provide a system in accordance with the previous objective which employs a mode of operation making use of the structural features of commonly available television electronic equipment.

Figure 1:
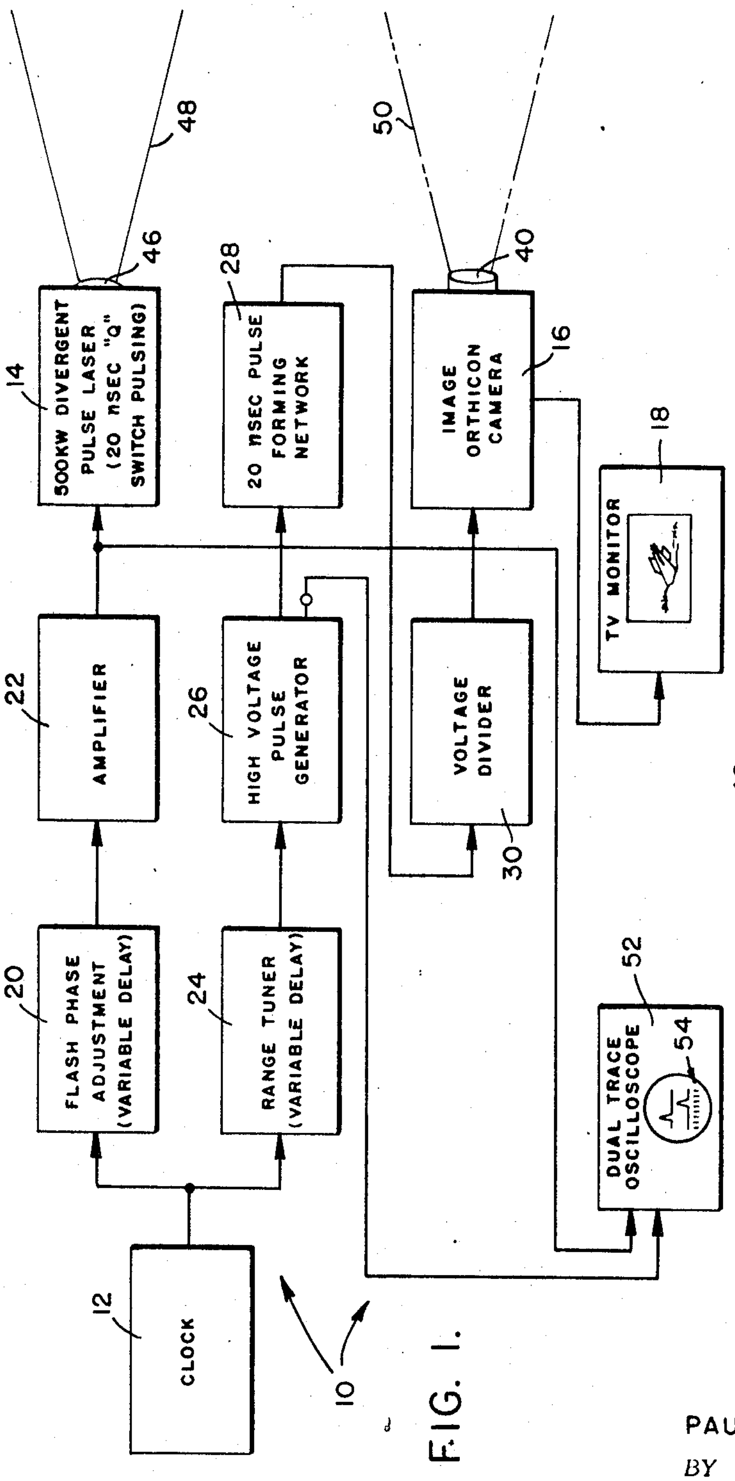
Figure 3:
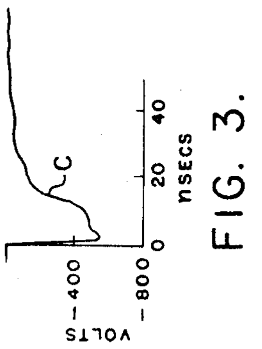
Figure 4:
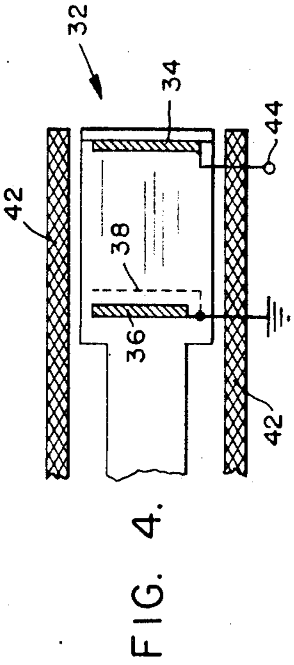
Figures 2, 5, 6:
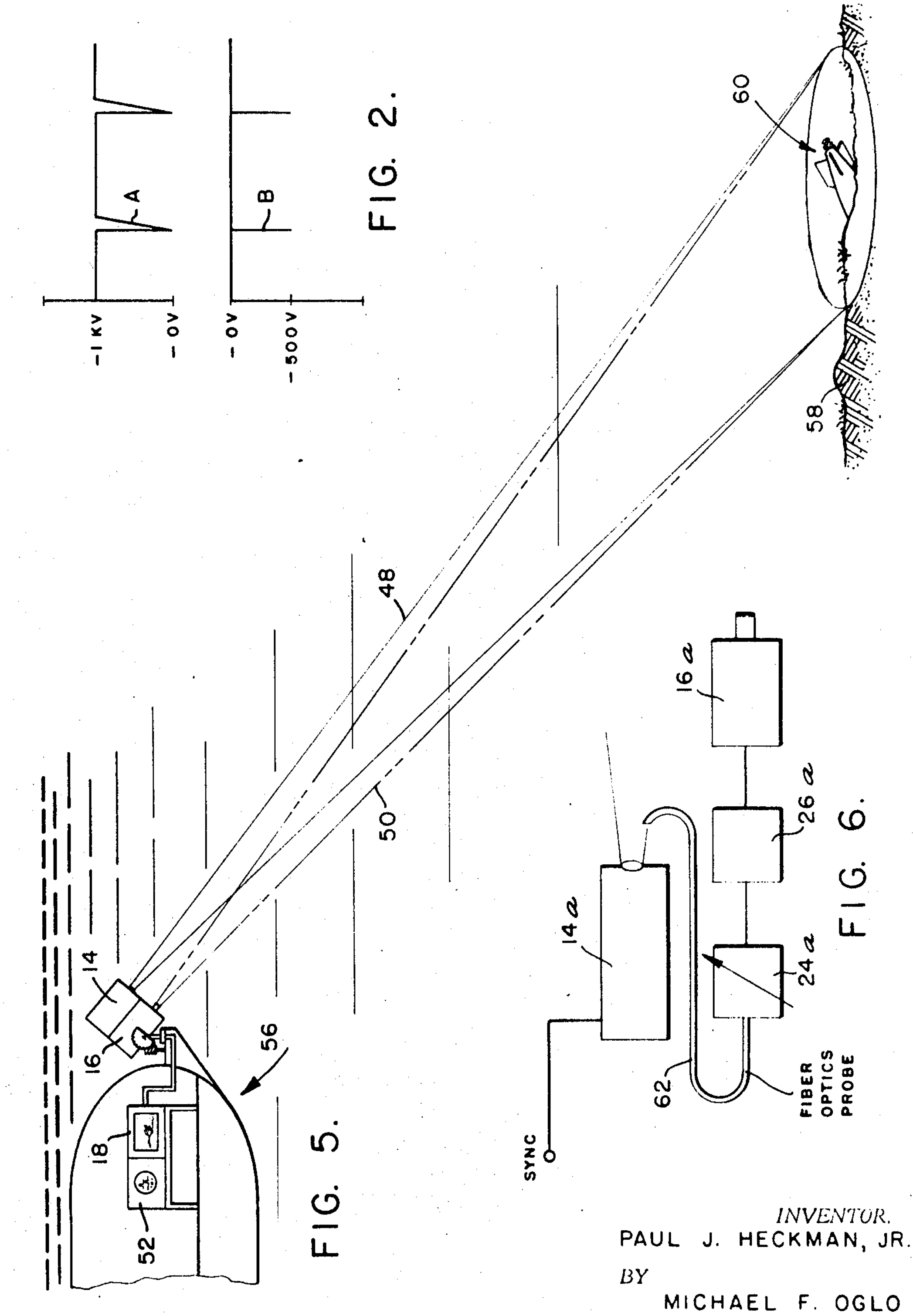

Other objects and many of the attendant advantages of this invention will be readily appreciated as the same becomes better understood by reference to the following detailed description when considered in connection with the accompanying drawings wherein:

FIG. 1 is a block diagram of an improved television system in accordance with the present invention, FIG. 2 is a waveform timing diagram of signals in the system of FIG. 1, FIG. 3 is an expanded time scale waveform of Wave B, FIG. 2, FIG. 4 is a diagrammatic illustration of a portion of the image orthicon tube employed in the system of FIG. 1, FIG. 5 depicts the system of FIG. 2 in an operational embodiment, and FIG. 6 illustrates an alternate form of invention.

Referring now to the drawing and in particular to FIG. 1, the subject of the invention is a television monitoring system 10 of special utility for underwater use. System 10 comprises a time base clock circuit 12, a pulse laser 14, an image orthicon-type television camera 16, and a television monitoring screen 18. Pulse laser 14 is synchronized to the time base clock 12 by a flash synchronization channel comprising a flash phase adjustment circuit 20 formed by a variable delay network having a nanosecond order of resolution, and an amplifier 22. Circuits 20 and 22 may be of any signal circuit construction suitable for processing trigger signals. Television camera 16 is synchronized to the time base clock by a camera gating delay channel comprising a range tuner 24 consisting of a variable delay circuit having nanosecond resolution capability. The delay synchronizing signal from the range tuner triggers a high voltage (1 kv.) pulse generator 26. The output from generator 26, Wave A, FIG. 2, is then shaped by a 20 nanosecond pulse forming network 28. The signal magnitude is divided by a factor of two in a voltage dividing network 30. The resultant output signal from the camera gating delay channel is a 500 v. pulse having an approximate duration of 20 nanoseconds, Wave B, FIG. 2. In the case of high voltage pulses with pulse durations of the order of 20 nanoseconds, accurately square pulse shapes cannot be obtained with state-of-the-art circuitry. The actual waveshape of signal at the output of voltage divider 30 is depicted as Wave C, FIG. 3. Note that the actual waveshape has the majority of its decay taking place before 20 nanoseconds have lapsed. This shape of waveform had to be accepted in order to provide a gating action with reasonably accurate 20 nanosecond resolution. Wave C is the same signal as depicted by Wave B, FIG. 2, except that the time scale is greatly expanded.

Television camera 16 has a conventional image orthicon-type pickup tube 32. Tube 32 contains a photocathode electrode plate 34 and a target plate 36 in axial spaced relation. The photocathode plate 34 is at the front end of the tube, and forms an optical flat for receiving the optical image. A screen electrode 38 is disposed adjacent the front face of target plate 36. A suitable objective lens 40, FIG. 1, focuses the scene within the view of the camera on the photocathode plate. An arrangement of wire coils 42 for producing a magnetic field surrounds the space between the plates. Target plate 36 and screen 38 are returned to ground potential. Photocathode 34 is connected to a pickup tube gate signal input terminal 44. A constant current is supplied to coils 42, impressing a constant magnetic field upon the space between the electrode plates. Photocathode 34 comprises a coating of cesium-type photo emissive material on the inner surface of the glass envelope. This coating emits electrons to an extent dependent upon the intensity of impinging light. The distribution of electron emission along the surface as a whole, therefore, forms a replica of the optical image focused thereon. Target plate 36 and screen 38 form a charge storage surface. Photocathode 34, target 36, screen 38, and wire coils 42 form an electronic shutter between the photo emissive surface and the charge storage surface, which is responsive to a gate signal applied to terminal 44. When photocathode 34 is at the ground potential level of the target, the electron emission from photocathode 34 is not transmitted across the space separating it and the target, and the arrangement acts as a closed shutter. When a nominal gate voltage of —400 v. is applied to terminal 44, the magnetic field produced by coil 38 and the electrostatic field between the photocathode 34 and the grounded target 36 act in concert to focus the electron emission replica of the optical image from photocathode 34 to target 36. The 20 nanosecond pulse signal from the voltage divider 30 acts as a shutter opening signal for the period the 400 v. is coupled to the gate voltage input terminal 44.

The manner in which the charge image along the target is converted to a video signal is well known in the art. Briefly, a low velocity electron beam (not shown) sweeps past the rear surface of the plate 36, and is then received by a collector (not shown). The beam is adapted to pass close to the surface of the plate 36, but does not impinge it. The beam is modulated depending upon the extent that electrons therefrom are transferred to the target to neutralize the charge condition on the finite area of the storage surface under scan of the beam. The beam follows a conventional scan pattern which scans the full field of the area of the target at the conventional rate of 60 times per second. The scan pattern includes a blanking period in which the electron beam is blanked out while the electron beam trajectory deflection circuitry performs its "flyback" from the end of the scan pattern of one field to the start of the scan pattern for the next field. The start of the scanning cycle of each field is kept in a predetermined phase relation to the 20 nanosecond gate signal applied to terminal 44 to avoid jitter. Also, this phase relationship preferably is such that the 20 nanosecond signal coincides with blanking period of the scan cycle in order to avoid streaking. This may be done by any of the well known techniques for adjustment of phase synchronism.

Pulse laser 14 provides a high intensity flash of a duration matched to the period of the gating pulse applied to the orthicon tube, i.e. 20 nanoseconds. The pulse laser must also be accurately synchronizable by trigger signals. Successful embodiments of system 10 have made use of a laser pulsed by conventional rotating prism "Q-switching." Kerr cell or Pockle cell methods of pulsing could also be used. For underwater work, the laser should preferably produce a blue-green type light. Successful results were obtained using a neodymium-doped ¼" diameter glass rod, 3" long, with a polished surface at one end and a total reflecting wedge on the other. An optical flat with a dielectric coating peaked for 50% reflectivity at 1.06 microns completed the laser cavity. The second harmonic at 5,300 angstroms is generated (with an efficiency of 5%) by passing the intense 1.06 micron radiation to a potassium di-hydrogen phosphate KDP crystal outside the cavity. Lasers output power of 500 kilowatts is desired for underwater work. Lasers having these characteristics are commercially available from Electro-Optical Systems, Inc. Laser 14 is also provided with a divergent lens system 46, FIG. 1, providing a cone of illumination 48 having an included angle which is suited for the intended ranges of operation of the system. The objective lens 40 for the television camera provides a matching cone of view 50.

The time base clock 12 produces synchronization pulses at the rate of field scan of television camera 16, i.e. 60 c.p.s. The trigger signal from amplifier 22 in the flash synchronization channel, and the signal from high voltage pulse generator 26 in the camera gating delay channel, are applied to one and the other of the inputs of a dual trace oscilloscope 52 having a nanosecond order of sweep resolution. The signal applied to the oscilloscope 52 from high voltage generator 26 is conventionally attenuated and shaped to appear as a spike by suitable coupling and wave shaping circuitry, not shown. The sweep of the dual trace oscilloscope is provided with a calibrated scale 54 in range equivalents of nanosecond delay times, to enable an operator to perform range tuning with direct reference to a distance scale. The proportionality relationship for converting nanosecond delay times to their range equivalent in feet is approximately 4:3. For example, a delay of 20 nanoseconds is equivalent to tuning the television system to pick up a picture at a depth field starting at a minimum distance of 15 feet from the camera tube. The proportionality relationship is based upon the two-way distance (to a reflecting object and back) over which light may travel in the period of the delay. This in turn is based upon the velocity of light in the medium in which system 10 is used, namely water.

The operation of television monitoring system 10 will now be described with reference to FIG. 5 wherein the pulse laser 14 and the image orthicon camera are shown externally carried by a small search submarine 56. The TV screen 18 and other electronic components of system 10 are contained within the submarine 56, where a member of its crew serves as the operator of the system 10. Submarine 56 is engaged in an operation to search the ocean floor 58. It is assumed that the ocean floor depicted in the drawing is at a slant range distance of 20 feet from the camera along the camera line of sight axis. The object 60 on the ocean bottom within the cone of illumination of the pulse laser is depicted as a torpedo which is half sunken in the ocean bottom.

Several adjustment steps are performed at the commencement of operation. These steps consist of adjusting pulse laser 14 into a phase synchroniaztion condition in which the sync trigger from amplifier 22 appears at the origin of the sweep of the dual trace oscilloscope, and then presetting the delay of the camera gate pulse. The first adjustment is effected by means of the flash phase adjustment 20. The second adjustment is effected by range tuner 24 which is adjusted to "tune in" the desired range of the depth of field to be picked up by system 10. The operator makes this adjustment with reference to the calibrated scale 54 on the dual trace oscilloscope 52. It will be assumed that the operator has chosen a setting of minimum range of 15 feet, which corresponds to a phase delaying of the output pulse from generator 26 by the amount of 20 nanoseconds relative to the sync pulse from amplifier 22. A setting of 15 feet represents a typical setting for exploiting the advantages offered by the present invention.

At the instant the sync trigger signal from amplifier 22 is applied to the pulse laser 14, the latter emits a high intensity flash of light, which is 20 nanoseconds in duration. The television camera remains in a "closed shutter" condition during the delay before the high voltage gate signal is applied to the photocathode terminal 44 of the image orthicon tube 32. Thus, while the light travels from the source to the target none of the backscattering due to the turbidity of the water medium is picked up by camera tube 32. At the precise moment when the light reflected from a point 15 feet from the camera is returned, the gate pulse, Wave C, FIG. 3, actuates the camera tube to its open shutter condition. The gate signal enables the camera to collect the light returning to the camera tube during the period the photocathode potential exceeds 400 volts, yielding a depth of field of optical image of approximately 10 feet starting at the 15 foot minimum distance determined by the delay. The high intensity flash of light reflected from target 56 produces a stored image of the object on the target electrode 36 of the pickup tube. When the gate signal drops below 400 v., the pickup tube once more returns to its closed shutter condition. This stored image is converted to a video signal by the conventional low velocity beam scan process. The target is completely scanned before the next occurrence of flash and gate signal. This video signal is converted to an electron tube picture by monitor 18. This cycle of flash and pickup of image is repeated at the 60 c.p.s. rate. The television monitor screen shows a clear picture of object 60 with a minimum backscatter, because the camera tube is in its closed shutter condition during the period in which the camera would pick up a diffused blur of light due to backscattering within the first 15 feet of range of the water medium.

It has been found that the improvements to an underwater television system in accordance with the present invention increase the range of deep ocean television viewing by an approximate factor of two over the prior art. Thus television system 10 can double the 15 foot limit mentioned in the preamble, enabling search of the bottom at slant ranges of the order of 30 feet. This performance represents limits of state-of-the-art techniques for intensity of pulse illumination and limits of state-of-the-art techniques for wave shaping of pulse signals of nanosecond order of duration. It could be exceeded as the art improves.

An important feature of the invention is that its mode of operation may be implemented with the structural features present in the commercially available image orthicon tube.

FIG. 6 shows a modification in which the camera **16*a* is synchronized to the pulse laser 14*a* by an arrangement comprising a fiber optic probe 62 which triggers the range tuning circuit 24*a*** in response to occurrence of emission of a flash from the pulse laser. This eliminates the need for two adjustable synchronization channels. The 60 c.p.s. sync signal is applied directly to the pulse laser.

Obviously many modifications and variations of the present invention are possible in the light of the above teachings. It is therefore to be understood that within the scope of the appended claims the invention may be practiced otherwise than as specifically described.

What is claimed is:

1. In a television monitoring system for use in viewing an underwater scene, the combination, comprising:

(a) a television camera including a pickup tube of the image orthicon type having first and second spaced electrode plates comprising a photo-emissive surface upon which the optical image is focused, and a charge storage surface, respectively, said tube including means for generating a magnetic force field within the space between the plates and being operative to impress the electrons emitted from the first photo-emissive surface upon the charge storage surface as a charge image in response to application of a pickup tube gate potential between the first and second electrode plates, said tube being operative to produce a video signal in accordance with the charge image by scanning the charge storage surface with a low velocity electron beam adapted to provide a fluctuating output signal in accordance with differences in charge state of finite areas of the charge storage surface impinged upon by the electron beam under scan;

(b) a high intensity pulsed laser illumination source disposed adjacent the television camera for projecting periodic flashes of illumination in the direction of the line of sight of the camera, the illumination flashes having a predetermined flash duration having an order of magnitude of 20 nanoseconds, (c) a gate pulse generator operative in synchronized relation to the pulsed illumination laser source to apply a pulse signal of an amplitude equal to the pickup tube gate potential across the first and second plates of the pickup tube in a predetermined delayed timed relation to the pulsing of the illumination laser source, said gate potential pulse signal having approximately the same duration as the flash duration and occurring after predetermined delay following the illumination flash to gate the television camera tube to pickup only the illumination reflected from a desired range of distances from the camera.

2. Apparatus in accordance with claim 1, (d) said high intensity pulsed laser illumination source being a pulsed laser source which emits light in the blue-green region of the light spectrum.

3. Apparatus in accordance with claim 2, (e) said pulsed laser source being of the doubled neodymium type employing a Q-switch type pulsing system.

4. Apparatus in accordance with claim 1, further comprising:

(f) a fibre optic probe which samples the output of the pulsed laser source and whose output controls the gate pulse generator.

References Cited

UNITED STATES PATENTS

| | | | |
|---|---|---|---|
| 3,305,633 | 2/1967 | Chernoch | 178—6.8 |
| 2,996,946 | 8/1961 | Brendholdt | 88—1 |

ROBERT L. GRIFFIN, Primary Examiner

R. L. RICHARDSON, Assistant Examiner

U.S. Cl. X.R.

178—6.8